(No Model.)

J. R. OLIVER.
EGG CRATE.

No. 518,893. Patented Apr. 24, 1894.

WITNESSES
S. E. Thomas
Levi F. Coy

INVENTOR
John R. Oliver.
By Lucius C. West.
Atty.

United States Patent Office.

JOHN R. OLIVER, OF PORTAGE, MICHIGAN, ASSIGNOR OF ONE-HALF TO WILLIAM H. OLIVER, OF SAME PLACE.

EGG-CRATE.

SPECIFICATION forming part of Letters Patent No. 518,893, dated April 24, 1894.

Application filed February 12, 1894. Serial No. 499,981. (No model.)

*To all whom it may concern:*

Be it known that I, JOHN R. OLIVER, a citizen of the United States, residing at Portage, (post-office address, Kalamazoo, Michigan,) county of Kalamazoo, State of Michigan, have invented new and useful Improvements in Egg-Crates, of which the following is a specification.

This invention relates to egg-crates, which employ egg holding trays the bottom slats or bars of which are provided with elastic wire loops between which loops the eggs are held.

The main object of the invention consists in so forming the loops and attaching them to the slats of trays, that the entire surface of the upper bow and the sides of the loops next to the eggs will contact therewith, and the eggs be held firmer yet elastically, and with a more desirable and equal distribution of the clamping pressure on the eggs which is especially important in case of eggs for propagating purposes.

A further object is to employ in connection with the main loops, base loops made of elastic wire, to receive the small end of the eggs therethrough and assist in supporting them elastically.

Figure 1:
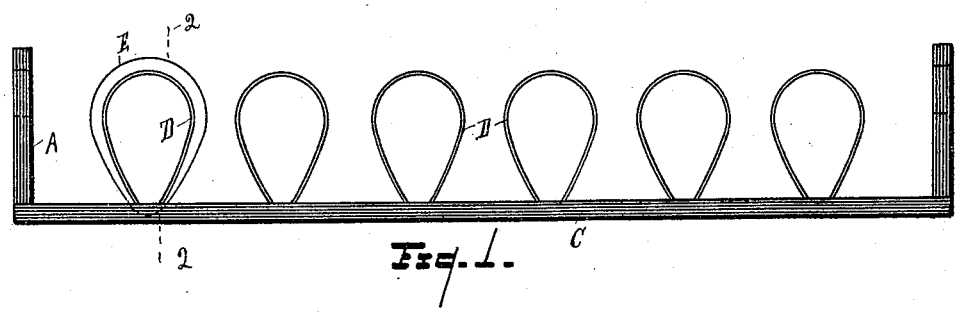
Figure 2:
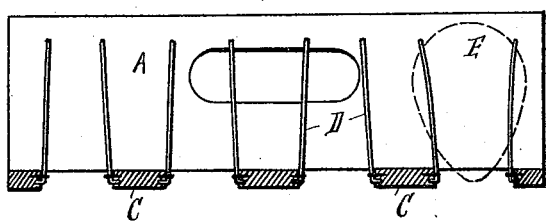

In the drawings forming a part of this specification, Figure 1, is a side elevation of one of the trays; Fig. 2, a cross section on line 2—2 in Fig. 1; and Fig. 3, an enlarged perspective view of a broken portion of one of the trays.

The trays consist of end pieces A, provided with a slot B, to receive the fingers of the hand in handling them, and separated slats or bars C, attached at the ends to said end pieces A.

In shipping the eggs the trays are stacked one onto the other, and placed in a crate or box made for the purpose, in the usual way. No crate or box is here shown as it is of common use and forms no part of this invention. The loops D, are attached to the slats or bars C, in a series of separated rows in the usual manner to fill the trays. I make the loops of elastic wire and nearly as possible in the form of an egg, their lower ends being brought together and attached to the edge of the slat or bar C, so as to form a complete loop. For this reason the loops D, have a more elastic swaying motion considered as a whole than would be the case were the lower ends of said loops separated and thus attached to the slats or bars, C, and hence the eggs are not held so rigidly in their upright position. These loops D, are attached one opposite to the other to the contiguous edges of the slats or bars C, and stand, prior to the insertion of the egg E, on a straight incline from the lower to the upper end, and converging toward each other at the top, as at D, Fig. 2.

After the eggs E, are inserted between the loops D, with the small end down, said loops flare away from each other as at the right in Fig. 2, and the entire surface of the bow and sides of the loops next to the egg clamps with an elastic pressure against the sides of the eggs. Thus the eggs are held firmly with an equalized distribution of the elastic pressure on them and at the same time are susceptible of a gentle elastic swaying motion in any lateral direction.

Figure 3:
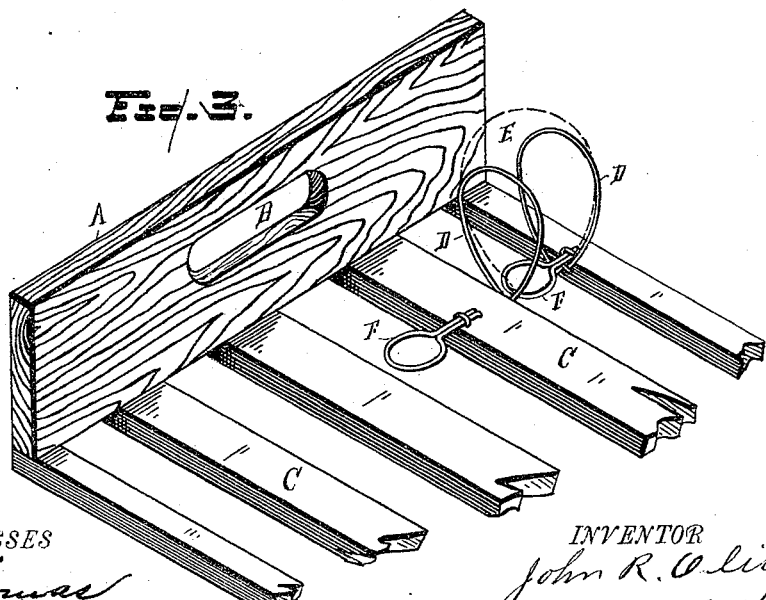

In Fig. 3, is shown an elastic loop F, its ends being attached to one of the slats or bars C, and the loop part being located between the lower ends of the egg shaped loops D, so as to receive the lower end of the egg therethrough, and thus assist in supporting the same in an elastic manner.

Having thus described my invention, what I claim, and desire to secure by Letters Patent of the United States, is—

1. In a slatted egg tray, elastic wire loops in pairs shaped like the outline of an egg, the lower ends of the loops being brought together at a common point where they are attached to the contiguous vertical edges of the slats, said loops being on a straight incline, converging toward each other from the bottom to the top, substantially as set forth.

2. A slatted tray, provided with elastic wire egg shaped loops attached in pairs to the contiguous edges of the slats, and on an incline to each other converging from the lower to the upper end, and an elastic base loop between the lower end of the main loops and adapted to receive the lower end of the egg therethrough, substantially as set forth.

3. A slatted egg tray, provided with main elastic loops between which the eggs are inserted, and elastic base loops between the lower ends of the main loops and adapted to receive the lower end of the egg therethrough, substantially as set forth.

In testimony of the foregoing I have hereunto subscribed my name in the presence of two witnesses.

JOHN R. OLIVER.

Witnesses:
WM. H. OLIVER,
GEO. W. MILLER.